(12) United States Patent
Edelman

(10) Patent No.: US 9,037,498 B1
(45) Date of Patent: *May 19, 2015

(54) METHOD, MEDIUM, AND SYSTEM FOR FACILITATING VEHICLE PURCHASES

(71) Applicant: 2knome LLC, Boca Raton, FL (US)

(72) Inventor: Jonathan Edelman, Boca Raton, FL (US)

(73) Assignee: 2KNOME LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/268,532

(22) Filed: May 2, 2014

Related U.S. Application Data

(63) Continuation of application No. 14/064,726, filed on Oct. 28, 2013, now Pat. No. 8,756,112.

(51) Int. Cl.
  *G06Q 30/00* (2012.01)
  *G06Q 30/06* (2012.01)
  *G06Q 50/18* (2012.01)

(52) U.S. Cl.
  CPC .......... *G06Q 30/0611* (2013.01); *G06Q 50/188* (2013.01)

(58) Field of Classification Search
  CPC .................................. G06Q 30/0611
  USPC ..................... 705/26.1, 27.1, 26.4
  See application file for complete search history.

(56) References Cited

U.S. PATENT DOCUMENTS

| | | | |
|---|---|---|---|
| 6,208,979 B1 | 3/2001 | Sinclair | |
| 7,734,530 B1 | 6/2010 | Domingue et al. | |
| 7,908,210 B2 | 3/2011 | Huber et al. | |
| 7,938,316 B2 | 5/2011 | Bennett et al. | |
| 8,340,983 B2 | 12/2012 | Grover et al. | |
| 8,355,983 B1 | 1/2013 | Parr et al. | |
| 8,392,280 B1* | 3/2013 | Kilshaw | 705/26.64 |
| 8,392,294 B2 | 3/2013 | Innis | |
| 8,744,925 B2 | 6/2014 | Seergy et al. | |
| 2002/0023051 A1 | 2/2002 | Kunzle et al. | |
| 2002/0082978 A1* | 6/2002 | Ghouri et al. | 705/37 |
| 2004/0059595 A1* | 3/2004 | Hoffmann | 705/1 |
| 2004/0133479 A1* | 7/2004 | Grove et al. | 705/26 |
| 2006/0218084 A1* | 9/2006 | Krautter et al. | 705/39 |
| 2008/0243681 A1 | 10/2008 | Levin et al. | |
| 2012/0005070 A1 | 1/2012 | McFall et al. | |
| 2012/0089479 A1* | 4/2012 | Felando Mattson | 705/26.7 |
| 2012/0101891 A1 | 4/2012 | Collier et al. | |
| 2012/0233014 A1 | 9/2012 | Banks et al. | |
| 2012/0265634 A1 | 10/2012 | Kinney | |

(Continued)

OTHER PUBLICATIONS

Feb. 2012—https://web.archive.org/web/20120315203016/http://www.leasecompare.com/.*

*Primary Examiner* — Matthew Zimmerman
(74) *Attorney, Agent, or Firm* — Duane Morris LLP; Gregory M. Lefkowitz

(57) ABSTRACT

Embodiments of the present disclosure provide an effective, user-friendly approach to help a buyer of a car, truck, boat, or other vehicle to get a firm quote from a dealer on a vehicle that the buyer wants, and is financially qualified for, without the hassle and time expense involved in traditional vehicle sales. Embodiments of the present disclosure also help link dealers with buyers who are pre-qualified and motivated to purchase a vehicle, thus helping to eliminate the wasted time, money, and opportunity costs dealers often devote to customers who are not interested in purchasing, and/or who do not financially qualify to purchase, a vehicle.

20 Claims, 15 Drawing Sheets

(56) References Cited

U.S. PATENT DOCUMENTS

| | | |
|---|---|---|
| 2013/0030985 A1 | 1/2013 | Shebesta et al. |
| 2013/0226683 A1 | 8/2013 | Bement et al. |
| 2014/0164188 A1 | 6/2014 | Zabawa et al. |
| 2014/0279171 A1 | 9/2014 | Burgiss et al. |

\* cited by examiner

PreQualification Application

First Name:

Middle Name:

Last Name:

Address 1:

Address 2:

City:

State:   Zip Code:

Date Of Birth (D/M/Y):

Social Security:

Gross Income:

Other Income:

What is the maximum Down Payment you would be willing to make?:

Time at your current employer:

Time at your previous employer (if current less than 24 months):

[x] I understand that by clicking this box, I am giving CarQualifier.com permission to use all data entered in this form for identity verification, Red Flag compliance, as well as locating and accessing my personal credit file.

[Submit]  [Cancel]

Fig. 5B

My Account  [Purchase A Package]  [My Vehicles]

Account Information:

Harold Johnson
6001 Broken Sound Parkway
Suite 416
Boca Raton, Florida 33487

Qualification Date: 09/28/13
Days Remaining: 29
Certificates Remaining: 4

Certificates:

| Certification Number: | Description: | Expires: |
|---|---|---|
| 201311987 | 2013 Cheverolet Camaro Coupe 2SS | 10/26/13 |

Fig. 7

| VEHICLE INFORMATION | | ADDITIONAL EQUIPMENT △ | |
|---|---|---|---|
| | DESCRIPTION | CODE | MSRP |
| BASE MSRP: $35,880 | ☐ SYNERGY SERIES SPECIAL EDITION | AJA | $5,995.00 |
| OPTIONS: $2565 | ☐ 45TH ANNIVERSARY PACKAGE | H45 | $1,375.00 |
| TOTAL MSRP: $38,445 | ☑ RS PACKAGE | WRS | $1,350.00 |
| | ☐ SUNROOF, POWER WITH EXPRESS OPENING AND VENTING | CF5 | $900.00 |
| LEASE PAYMENT | ☐ BLACK HOOD AND HOCKEY STRIPE PACKAGE | DSC | $510.00 |
| | ☐ GRAY HOOD AND HOCKEY STRIPE PACKAGE | DSF | $510.00 |
| $514/Month | ☐ WHITE HOOD AND HOCKEY STRIPE PACKAGE | DSD | $510.00 |
| | ☐ INTERIOR ACCENT TRIM PACKAGE | W1H | $500.00 |
| | ☐ BLACK STRIPE PACKAGE | C30 | $470.00 |
| FINANCE PAYMENT | ☐ CYBER GRAY METALLIC STRIPE PACKAGE | B7W | $470.00 |
| | ☐ ORANGE STRIPE PACKAGE | C2T | $470.00 |
| $673/Month | ☐ SILVER STRIPE PACKAGE | C24 | $470.00 |
| | ☐ WHITE STRIPE PACKAGE | B7X | $470.00 |
| | ☐ SHIFTER, HURST SHORT-THROW | KAE | $380.00 |
| ☐ Qualified ☒ Not Qualified | ☐ BLACK HOCKEY STRIPE PACKAGE | DSH | $275.00 |
| | ☐ GRAY HOCKEY STRIPE PACKAGE | DSJ | $275.00 |
| | ☐ WHITE HOCKEY STRIPE PACKAGE | DSK | $275.00 |
| | ☐ LICENSE PLATE BRACKET, FRONT | VK3 | $15.00 |
| | ☐ BRILLIANT RED/MEDIUM CHARCOAL STRIPE PACKAGE | CBM | $0.00 |
| | ⊞ HEADLAMPS, HIGH INTENSITY DISCHARGE | T4F | $0.00 |
| | ⊞ MOLDING, BODY-COLOR ROOF DITCH | BD8 | $0.00 |
| | REMOTE VEHICLE STARTER SYSTEM | BTV | $0.00 |
| | ☐ SILVER HERITAGE STRIPE PACKAGE | DSG | $0.00 |
| | ☐ STRIPE, DELETE | DX3 | $0.00 |

Fig. 9

METHOD, MEDIUM, AND SYSTEM FOR FACILITATING VEHICLE PURCHASES

CROSS-REFERENCE TO RELATED APPLICATION

This application is a continuation of U.S. Non-Provisional application Ser. No. 14/064,726, entitled METHOD, MEDIUM, AND SYSTEM FOR FACILITATING VEHICLE PURCHASES, filed Oct. 28, 2013, which is hereby incorporated by reference for all purposes.

BACKGROUND

Conventional methods for buying vehicles are often inefficient for vehicle dealers, unpleasant for buyers, and overly time consuming for both parties. On one hand, vehicle dealers often devote considerable time and resources to large numbers of customers who are not prepared to purchase a vehicle and/or who do not qualify for financing or leasing of certain vehicles. On the other hand, buyers are often uncomfortable with "high pressure" tactics employed by many salesmen. Both parties suffer from the sheer amount of time spent in negotiating terms of a sale or lease and preparing, reviewing, and signing the associated paperwork.

In recent years, the vehicle sales industry has attempted to take advantage of increasing willingness by consumers to purchase various products and services over the Internet. Many new vehicle dealerships, for example, dedicate at least a portion of their staff to Internet advertising, and to handling inquiries generated from the dealer's website or the websites of manufacturers and other third parties. While Internet advertising has provided some benefit, many vehicle dealers still end up devoting substantial amounts of time and resources contending with unqualified/unprepared buyers.

Embodiments of the present disclosure address these and other issues.

SUMMARY

Embodiments of the present disclosure provide an effective, user-friendly approach to help a buyer of a car, truck, boat, or other vehicle to get a firm quote from a dealer on a vehicle that the buyer wants, and is financially qualified for, without the hassle and time expense involved in traditional vehicle sales. Embodiments of the present disclosure also help link dealers with buyers who are pre-qualified and motivated to purchase a vehicle, thus helping to eliminate the wasted time, money, and opportunity costs dealers often devote to customers who are not interested in purchasing, and/or who do not financially qualify to purchase, a vehicle.

A method according to one embodiment of the present disclosure includes receiving, by a computer system, information from a buyer that includes: financial information for the buyer; and one or more vehicle payment parameters. The method further includes determining, by the computer system and based on the financial information for the buyer and the one or more vehicle payment parameters, a qualified vehicle payment amount; presenting, to the buyer, a list of a plurality of vehicles available to the buyer within the qualified vehicle payment amount; receiving, by the computer system, a request from the buyer for a quote on a selected vehicle from the plurality of vehicles; in response to receiving the quote request from the buyer, requesting, by the computer system, a quote on the selected vehicle from one or more dealers; receiving, by the computer system, a quote on the selected vehicle from a responding dealer from the one or more dealers; providing to the buyer, by the computer system, terms in the quote from the responding dealer; receiving an acceptance of the terms in the quote from the buyer; and in response to receiving acceptance of the quote from the buyer, providing a deal sheet to the buyer and the responding dealer that specifies the terms in the quote.

The present disclosure includes methods and apparatuses which perform these methods, including data processing systems which perform these methods, and computer readable media containing instructions that, when executed by computing systems, cause the computing systems to perform these methods.

Other features will be apparent from the accompanying drawings and from the detailed description which follows.

BRIEF DESCRIPTION OF THE DRAWINGS

FIGS. 5B and 5C depict exemplary data entry forms provided to a buyer.

FIGS. 6 and 7 depict exemplary decision aids generated for a buyer.

FIG. 9 depicts an exemplary data entry form provided to the buyer.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Any combination and/or subset of the elements of the methods depicted herein may be practiced in any suitable order and any number of times, and may be practiced in conjunction with any suitable system, device, and/or process.

Figure 11:
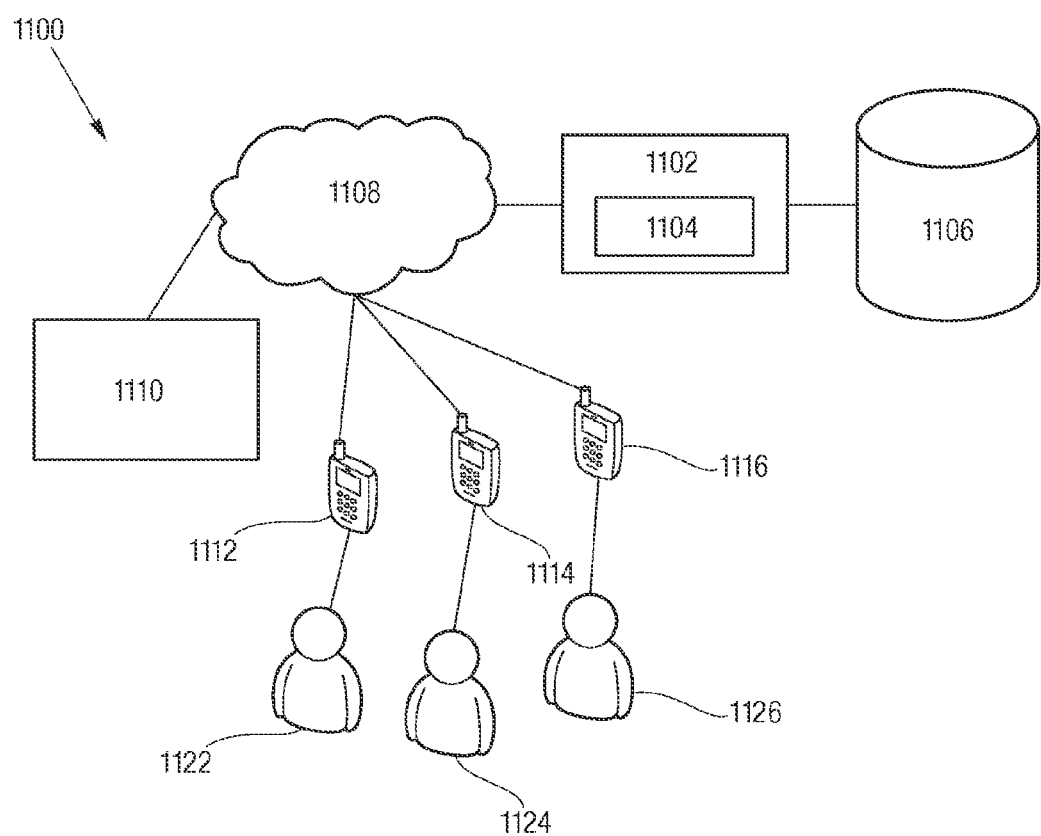
FIGS. 11 and 12 illustrate exemplary systems according to various embodiments of the present disclosure.
Figure 12:
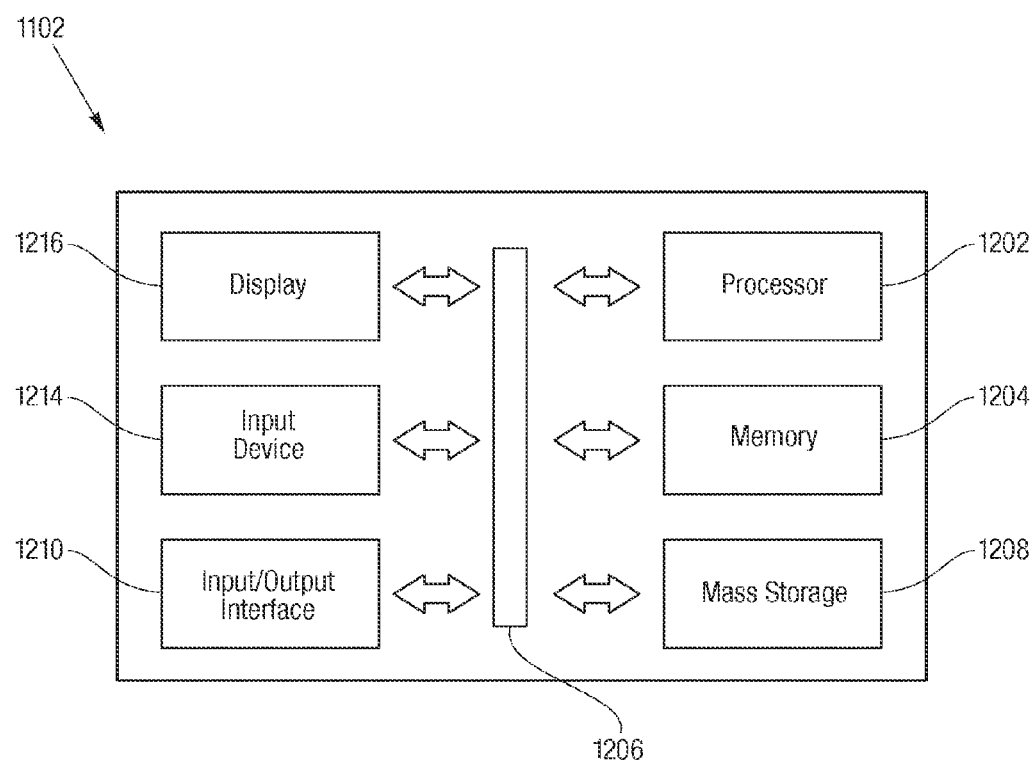

The methods described and depicted herein can be implemented in any suitable manner, such as through software operating on one or more computer systems, such as the systems and devices depicted in FIGS. 11 and 12. The software may comprise computer-readable instructions stored in a tangible computer-readable medium (such as the memory of a computer system) and can be executed by one or more processors to perform the methods of various embodiments.

Figure 1:
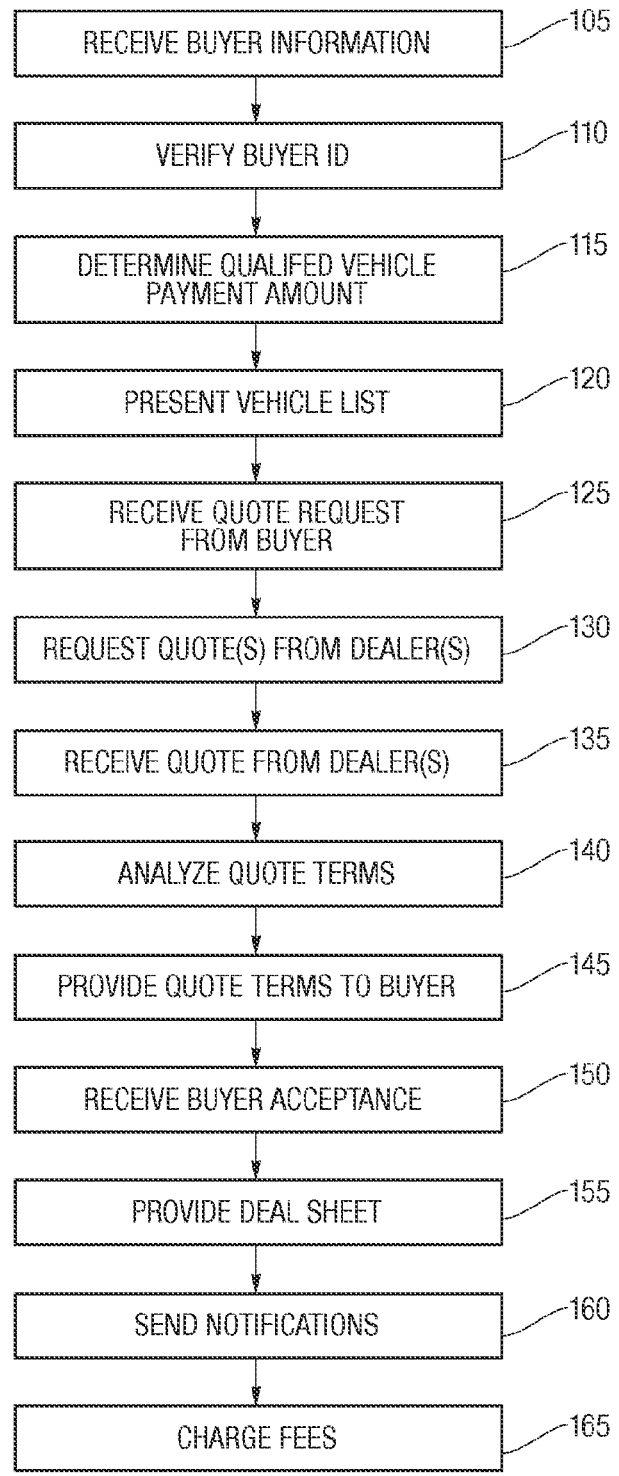
FIG. 1 depicts a method according to various embodiments of the present disclosure.

FIG. 1 depicts an exemplary process according to various embodiments of the present disclosure. In FIG. 1, method 100 includes receiving buyer information (105), verifying the identity of the buyer (110), determining a qualified vehicle payment amount (115), presenting a list of vehicles to the buyer (120), receiving a request for a quote on a vehicle from the buyer (125), requesting a quote from a dealer (130), receiving a quote from a responding dealer (135), analyzing quote terms (140), providing quote terms to the buyer (145), receiving buyer acceptance of quote terms (150), providing data sheets to the buyer and the responding dealer (155), sending notifications (160), and charging fees (165).

Embodiments of the present disclosure may provide a web-based interface through which a buyer can view information on vehicles and to obtain a payment amount for a lease, financed purchase, or cash purchase of a vehicle for which the buyer qualifies. In the context of this application, the "buyer" may be any individual, group of individuals, or business entity seeking to buy or lease a vehicle, while a "dealer" may be any individual, group of individuals, or business entity that owns a vehicle for sale or lease, or otherwise holds rights to lease or buy a vehicle (e.g., on behalf of a third party). Buyers and dealers may interact with systems implementing embodiments of the present disclosure using a variety of computing devices, such as electronic devices 1112, 1114, and 1116 in FIG. 11.

In one exemplary embodiment, a system (such as computer system 1102 in FIG. 11) receives information from the buyer (105) via a web interface. Any type of information may be received from the buyer in accordance with embodiments of the present disclosure, including personal or identification information (such as the buyer's name, age, social security number, driver's license number, and address), financial information (such as the buyer's weekly, monthly, or annual income; debts owed by the buyer; the buyer's payment history; and the buyer's credit score), payment parameters (such as a monthly payment for a lease or purchase of a vehicle; a duration of a lease period for a vehicle; a duration of a finance period for a purchase of a vehicle; and an amount of a down payment), and vehicle parameters (such as the make, model, year, mileage, trim, or other characteristics of a specific vehicle or group of vehicles the buyer is interested in buying or leasing.

In method 100, identification information supplied by the buyer is used to verify the buyer's identity (110). A failure to identify the borrower may result in any desired action, such as withholding further information or services from the buyer, requesting the buyer re-enter information or provide additional information, and/or alerting an authority (such as the police or a credit reporting agency) that of the failed identification verification.

The information from the buyer may be used to generate a qualified vehicle payment amount for the buyer (115). The qualified vehicle payment amount may indicate the maximum amount the buyer is qualified to spend on: a monthly payment for the lease or purchase of a vehicle, a down payment on a lease or purchase of a vehicle, and/or a cash purchase of a vehicle. The qualified vehicle payment amount may be calculated based on any desired criteria, such as a manufacturer's suggested retail price (MSRP), factory incentives, and dealer's fees. Exemplary formulas for calculating the qualified vehicle payment amount for financed purchase and lease transactions are described in more detail below.

The qualified vehicle payment amount may be determined based on financial information for the buyer, as well as one or more vehicle payment parameters. The qualified vehicle payment amount may also be determined based on a credit analysis of the buyer. Credit information for such an analysis may be provided by the buyer or retrieved from an accredited credit reporting agency (such as EQUIFAX) in response to the buyer giving approval to do so.

Embodiments of the present disclosure may present a list of vehicles (120) to the buyer that are within the qualified vehicle payment amount determined for the buyer, as well as any other vehicle parameters and/or vehicle payment parameters provided by the buyer, while excluding vehicles that do not fit these criteria. For example, a buyer may indicate he/she wishes to lease a 2012 (or newer) HONDA ACCORD having a blue exterior and fewer than 20,000 miles, and the qualified vehicle payment amount for the buyer is determined to be a monthly lease payment of $400 less. The list of vehicles presented to the buyer may then include only blue HONDA ACCORDs with fewer than 20,000 miles and that are available to lease for $400 or less per month. Embodiments of the present disclosure may allow the buyer to input additional information and/or to adjust existing information, such as vehicle payment parameters (e.g., the amount of the monthly payment) and the vehicle parameters (e.g., the color of the exterior), to modify the list of vehicles presented.

The list of vehicles presented to the buyer may include references to specific vehicles, or to a group of related vehicles. For example, a dealer may have four cars having the identical or near-identical make, model, and year. In such a case, an entry in the list of vehicles may refer to all four cars.

The buyer may request a quote (125) for one or more vehicles selected from the list. In response to the quote request for the buyer, systems implementing embodiments of the present disclosure can automatically request quote(s) on the vehicle from one or more dealers (130). For example, in situations such as the case above, where an entry in the list refers to multiple vehicles (potentially owned by multiple dealers), systems of the present disclosure may request quotes from each of the dealers. In other cases, where the buyer's request relates to a single vehicle (e.g., a specific new or used car), the request may be sent only to the dealer advertising that specific car. Alternatively, the quote request may be sent to all dealers having cars having some degree of similarly to the requested car. The buyer may be given the option to restrict quotes to a specific vehicle, or to accept quotes from multiple dealers and/or quotes relating to vehicles other than the vehicle selected by the buyer (e.g., vehicles similar in some aspect to the vehicle selected by the buyer).

The request for a quote on the selected vehicle may be sent to a dealer along with any desired information, such as the buyer's credit score (or other measure of the buyer's credit worthiness), vehicle payment parameters (e.g., the buyer's desired down payment and monthly payment), and/or vehicle parameters. Other information, such whether the buyer wishes to trade in another vehicle as part of a lease or purchase of the selected vehicle, as well as some or all of the information regarding the trade-in vehicle provided by the buyer (e.g., make, model, year, mileage, condition), may also be provided to the dealer.

Embodiments of the present disclosure may provide a listing, to all dealers to whom the quote was sent, with information regarding quotes sent by other dealers. This list may be rank-ordered to allow a dealer to see where the dealer's quote ranks among those from other dealers. This list may omit the names of the dealers, their addresses, and other information that could be used to identify the dealers to maintain the anonymity of each participating dealer. Likewise, the quote request sent to each dealer may omit any information that could be used to identify the buyer, thereby maintaining the anonymity of the buyer. Maintaining the anonymity by the embodiments of the present disclosure may provide a number of advantages, including preventing dealers from pursuing buyers who do not wish to be contacted by the dealer, and vice versa, thereby giving comfort and security to the buyer, and helping the dealer to avoid spending resources on buyers who are unlikely to buy, or who do not qualify to buy, a vehicle from the dealer. Additionally, keeping the identity of dealers confidential helps to eliminate bidding conflicts with other dealers, as well as buyers shopping for better deals from quoting dealers.

Some or all of the dealers to whom the quote request was sent may respond with a quote on the selected vehicle(s) (135). In various embodiments, dealers may provide input to a computer system implementing methods of the present disclosure to configure the types of quotes that are sent to the dealer, such as based on: a minimum credit score of the buyer, a maximum distance from the buyer to the dealer, whether or not the buyer has a trade-in vehicle, whether the dealer has the selected vehicle in stock or must order the vehicle from the manufacturer, or any other desired criteria. The quote received from the dealer (135) may include a vehicle identification number associated with the selected vehicle, pricing and other terms for the lease or purchase of the vehicle, an indication of the availability of the vehicle (i.e., whether the dealer has the vehicle on-hand or must order the vehicle from the manufacturer), as well as any other desired information.

In various embodiments, vehicles in the list of vehicles presented to the buyer may be restricted to those vehicles associated with dealers who have previously agreed to honor the quotes they send (135) in response to quote requests (130). In this manner, embodiments of the present disclosure help assure the buyer that, should he/she accept the quote terms from a dealer, the quote will be honored. Among other things, this helps give the buyer confidence in using the system of the present disclosure, and also helps to eliminate a common tactic used in conventional vehicle sales known as "bait and switch," where the buyer goes to a dealership expecting to purchase an advertised vehicle, only to find out the advertised vehicle has been sold and is then pressured to lease or purchase another (usually higher-priced) vehicle.

Embodiments of the present disclosure analyze the terms and information in the quote from each dealer (140), and provide some or all of the terms in the quote to the buyer (145). As described above, information that could be used to identify the dealer can be withheld from the buyer to maintain the anonymity of the dealer. Additionally, the terms and information in each dealer quote may be analyzed for any desired purpose, such as to verify the quote matches the quote request or other criteria (such as a maximum distance the buyer is willing to travel to the dealer) provided by the buyer, to identify errors in the quote, or for other reasons. In some exemplary embodiments, multiple quotes from different dealers may be analyzed to determine which quotes are most beneficial to the buyer, and the terms of such quotes presented to the buyer in order, with the most beneficial quote terms presented first, the next-most beneficial terms presented second, and so on.

Determining the advantageousness of a quote may be based on any desired criteria, such as a percentage discount from a manufacturer's suggested retail price for the selected vehicle offered by a dealer; a level of similarity between the selected vehicle and a vehicle from a dealer; an availability of the selected vehicle from a dealer; and a financial value associated with an offer from a dealer, the offer including one or more of: a financed purchase of the selected vehicle, a lease of the selected vehicle, and a cash purchase of the selected vehicle. Such criteria may be analyzed for each quote and the quotes compared based on the criteria. The criteria may be weighted in any suitable manner, such as based on input from the buyer.

The buyer may indicate acceptance of one or more sets of quote terms (150). The buyer may indicate such acceptance in any suitable manner, such as by digitally signing a form via a web interface. In some embodiments, the buyer may accept some terms of a quote, but ask for other terms to be revised, in which case the request to revise the quotes is sent back to the dealer for acceptance of the revision, rejection of the revisions, cancellation of the quote, or a counter-proposal regarding the disputed terms by the dealer.

Upon acceptance of the quote terms by the buyer (150), a deal sheet specifying the terms offered by the responding dealer in the quote, and agreed-to by the buyer, are provided to both the dealer and the buyer (155). In some embodiments, prior to the deal sheet being provided, the responding dealer and/or the buyer may be asked to provide verification that they wish to proceed with the deal under the terms accepted by the buyer. Upon receiving such verification, the deal sheets are provided to each party. Failure to receive such verification from either party within a predetermined period of time may cancel the deal or cause embodiments of the disclosure to prompt either party for further input.

In addition to the terms agreed to by the dealer and the buyer, the deal sheet may include any other desired information. For example, in embodiments where the identification of the buyer and/or dealer is protected (e.g., by withholding information that would identify the buyer from the dealer and vice versa) the deal sheet may detail the contact information of the buyer and the dealer so that they can complete the transaction for the vehicle. The deal sheet may also include a description of the specific vehicle being sold or leased (e.g., by identifying the vehicle's unique identification number) as well as a unique certificate number generated by the system implementing embodiments of the disclosure to identify the transaction between the buyer and the dealer.

Various notifications may be sent (160) to the buyer and/or dealers to convey various information. For example, a buyer may be sent a notification to alert the buyer that a newly-advertised vehicle matching criteria previously-searched-for by the buyer has been added to the vehicle database from which the list of vehicles is compiled. Additionally, the buyer may be sent a notification if a dealer declines (or fails to respond to) verification of the terms accepted by the buyer.

Notifications to dealers may also be provided, such as a notification to dealers providing quotes that are not accepted by the buyer. Such a notification may include information regarding where the rejected dealer's quote ranked among the quotes from either dealers (including how each specific portion of the quote ranked, if desired), and may be presented graphically (e.g., using graphs and charts).

Embodiments of the disclosure may charge one or more fees (165) to the buyer, seller, and/or a third party. For example, the buyer may be charged a fee to generate the buyer's qualified vehicle payment amount, and/or the dealer may be charged a fee when a quote request sent to the dealer and/or when a deal sheet specifying agreement between the buyer and the dealer is delivered.

Figure 2A:
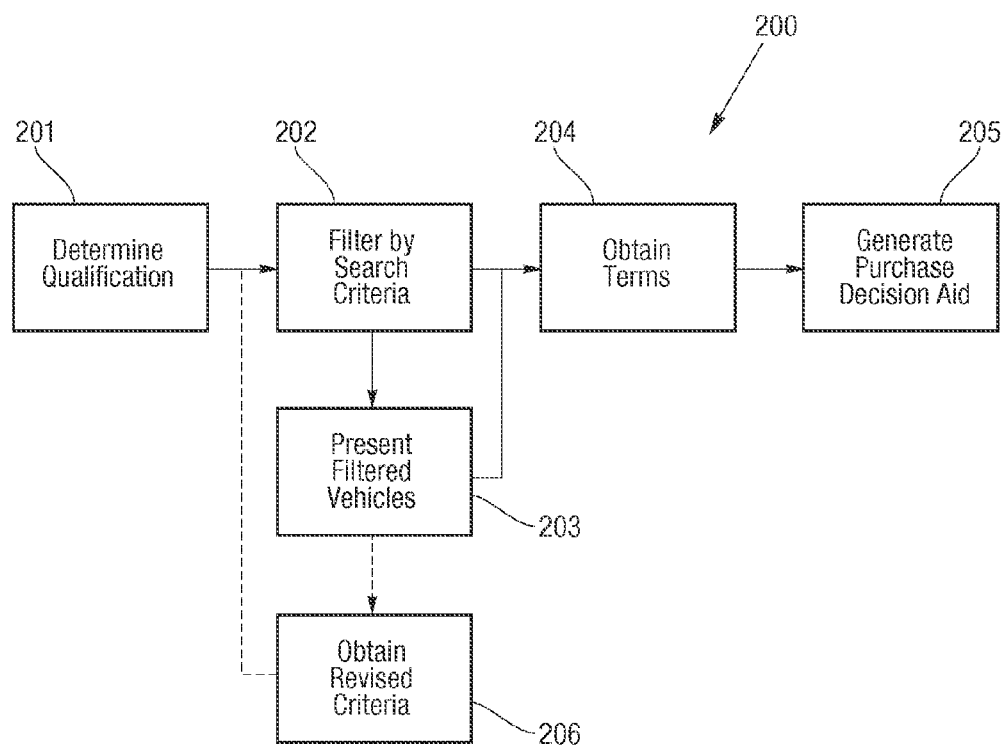
FIGS. 2A, 2B, and 3 depict methods for providing purchase decision assistance to a buyer according to various embodiments of the present disclosure.

FIG. 2A illustrates an exemplary method for iteratively providing vehicle purchase decision assistance to a buyer. As shown, method 200 includes determining a buyer qualification (e.g., the qualified vehicle payment amount) based on information related to the buyer (e.g., received from the buyer as described above) (201). Method 200 further includes filtering a list of vehicles from an electronic database of vehicles (202) based on search criteria that may include the determined buyer qualification as well as other desired criteria, such as vehicle parameters (e.g. vehicle make/model/year, vehicle trim packages, etc.) and vehicle payment parameters (e.g., financing and leasing options available to the buyer). The list of vehicles may include any number of vehicles, and is presented to the buyer (203) according to a set of presentation criteria, which can be set from default criteria or obtained from the buyer. The list of vehicles can be presented with a qualification indication as to whether the vehicles can be leased or financed according to the buyer qualification, as described with regards to FIG. 8 below.

Method 200 further includes obtaining terms (204) for a vehicle selected by the buyer from the list of vehicles. The terms may be obtained in any desired manner, including as described with reference to steps 125-150 in FIG. 1, above. The buyer may revise search criteria (206), which may result in a different list of vehicles being identified (202) and presented (203) to the buyer. In one exemplary embodiment, when a buyer revises search criteria for the vehicles (206), the terms may be obtained (204) again so as to update the qualification indication to the buyer.

A purchase decision aid is generated for the buyer (205) so as to permit the buyer to purchase or lease the selected vehicle according to the obtained terms. The purchase decision aid can be generated in the form of an electronic or hardcopy document to assist in the buyer in making a purchase decision. In one embodiment, the purchase decision aid can be a deal sheet (see above) or other certificate documenting the verified credit rating of the buyer, which can be used by the buyer to purchase or lease the vehicle from a dealer. In another embodiment, the purchase decision aid can be an informational document, which can include all of vehicle information, including trim and buyer qualification determined from an estimated personal credit rating.

Figure 2B:
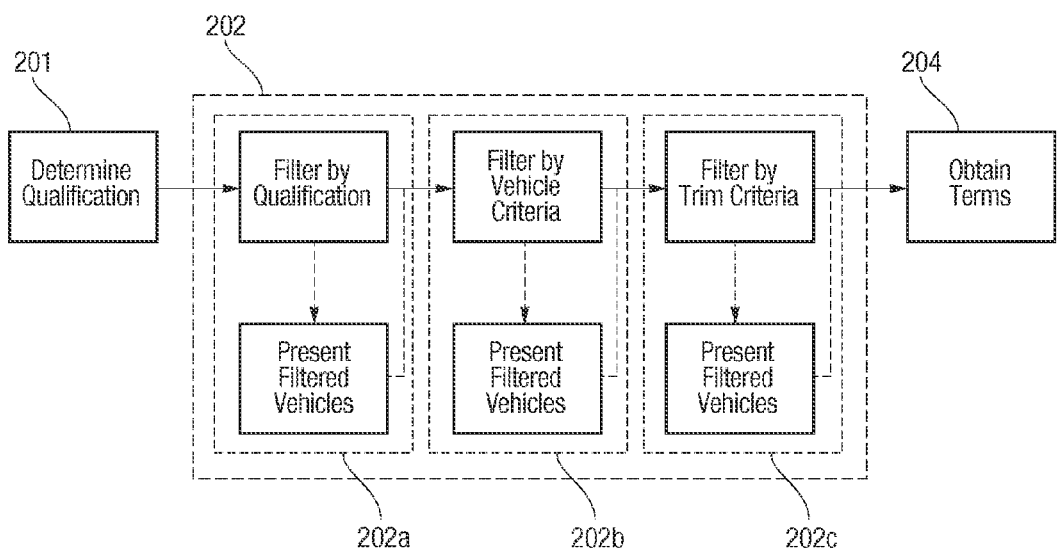

As shown in FIG. 2B, step 202 of FIG. 2A can be performed as a sequence of three filtering steps 202a, 202b, and 202c. According to other embodiments, the step 202 can include a permutation sequence of the three steps 202a, 202b, and 202c, in which the step 202a is performed after one or both of steps 202b and 202c. According to one embodiment, filtering step 202a can be a step of filtering vehicles according to whether the buyer can qualify for a financing or leasing option. Filtering step 202b can be a step of filtering vehicles according to whether the vehicle satisfies a set of buyer specified vehicle criteria. Filtering step 202c, meanwhile, can be a step of filtering vehicles according to whether the vehicle can satisfy a set of buyer specified trim criteria. According to one embodiment, filtered vehicles from each of the steps 202a, 202b, and 202c can be presented to the buyer.

The sequential order of the steps 202a, 202b, and 202c may also be permuted such that the filtering step 202a can be performed between the filtering step 202b and the filtering step 202c, or the filtering step 202a can be performed after both filtering steps 202b and 202c. Each of the filtering steps 202a, 202b, and 202c can be performed to further filter a previously filtered set of vehicles. Each of the filtering steps 202a, 202b and 202c can be performed without performing the other filtering steps.

Figure 3:
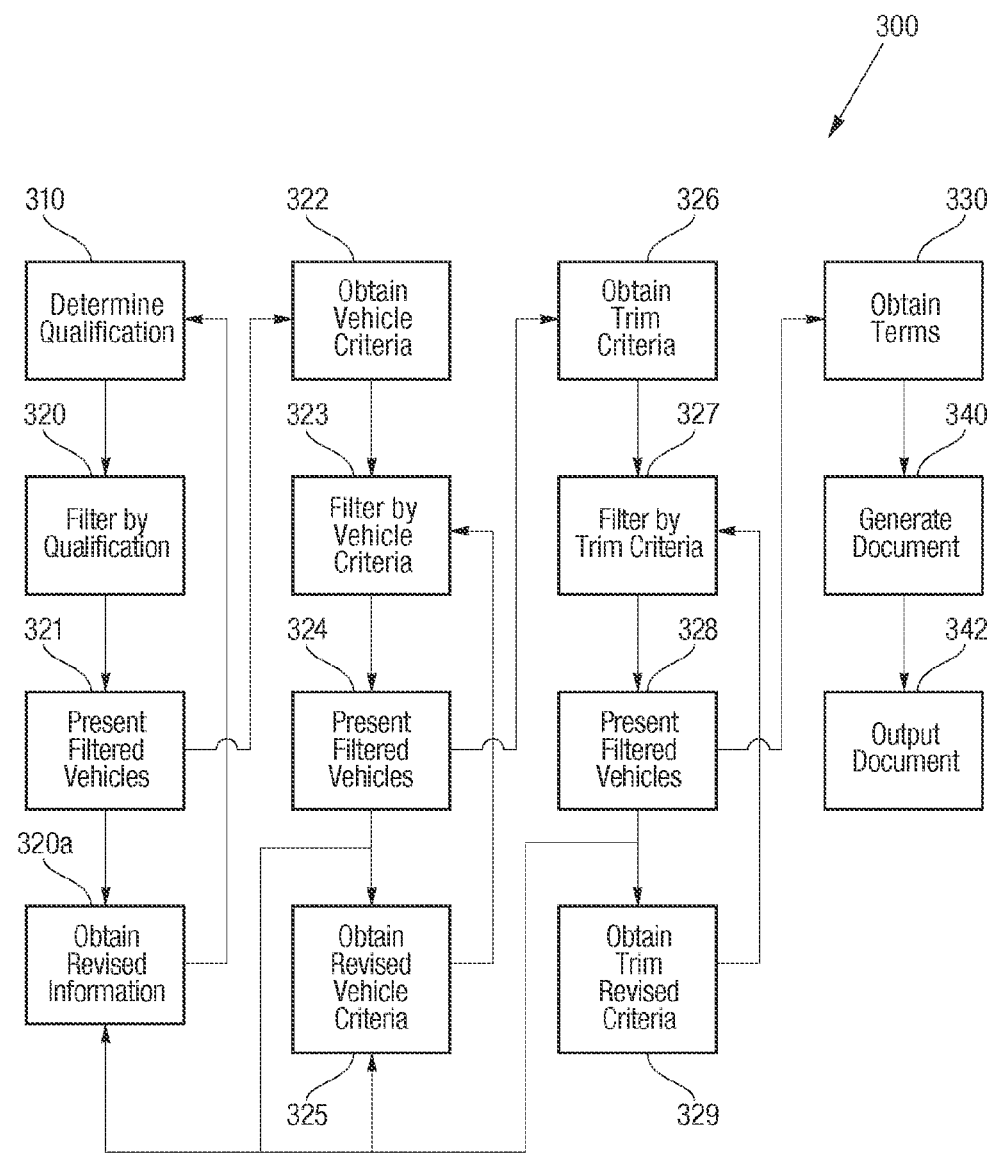

Another exemplary method 300 is depicted in FIG. 3. In this example, the resulting list of vehicles from the filtering steps 320, 323, and 327 are presented in steps 321, 324, and 328, and the buyer is permitted to revise presentation criteria for each of the filtering steps in steps 320a, 325, and 329.

In step 310, the buyer qualification is determined based on a buyer credit rating and a set of personal information regarding the buyer. Method 300 can provide a purchase decision aid (e.g, electronic or hardcopy document or certificate) based on verified information (e.g., from a credit report retrieved from a credit agency) as described with reference to FIG. 5A below, or based on the buyer's own stated, but unverified, personal information and credit rating as described in the next paragraphs.

In step 320, the vehicles from the electronic database are filtered according to the determined qualification of the buyer and, in step 321, the filtered vehicles are presented to the buyer. A revised set of stated financial information may also be obtained from the buyer in step 320a. As such, the buyer can be provided with a simulation in which the buyer can state a hypothetical credit rating and obtain a simulated set of filtered vehicle that correspond to the hypothetical credit rating. This simulated set of vehicle results can be useful when the buyer can take steps to improve his or her personal crediting rating by, for example, paying down outstanding debts.

Method 300 further includes a step 322 for obtaining a set of buyer-selected vehicle criteria, a step 323 for filtering the vehicle according to the buyer-selected vehicle criteria, and a step 324 for displaying the vehicles filtered in step 323. Method 300 further includes a step 325 for obtaining a revised set of vehicle criteria from the buyer so as to cause steps 323 and 324 to be performed again to provide the buyer with a revised set of filtered vehicles. Step 324 can permit the buyer to return to step 320a in order to obtain revised financial information.

Method 300 further includes a step 326 for obtaining a set of buyer-selected trim criteria, a step 327 for filtering the vehicle according to the buyer-selected trim criteria, and a step 328 for displaying the vehicles filtered in step 327. Method 300 further includes a step 329 for obtaining a revised set of trim criteria from the buyer, so as to cause steps 327 and 328 to be performed again to provide the buyer with a revised set of filtered vehicles. In one embodiment, step 328 can permit the buyer to return to steps 320a or 325, to obtain revised financial information, or vehicle criteria, respectively.

Method 300 further includes a step 330 for obtaining a set of terms for a buyer-selected vehicle from the filtered vehicles. Using the obtained terms, method 300 can includes a step 340 for generating a purchase decision aid, a document that, for example, provides the buyer with a set of information including the buyer-selected vehicle and trim criteria, the estimated credit rating, and the obtained terms. The document can be generated to further include information relating to a filtered list of one or more vehicles that satisfied the search criteria. Method 300 includes step 342 for outputting the generated estimate document. The generated estimate documents can be output in the form of a printed document, as well as in the form of an electronically shareable document, e.g. a PDF document.

Alternatively, it should be appreciated that method 300 can also allow the buyer to request on-line quotes (i.e., terms for the selected vehicle) from participating dealers after step 330, based on the buyer qualification data. In such an approach, the buyer may be able to obtain from multiple dealers financing fees, down payment amount, delivery fees and other information necessary to allow the buyer to select the dealer with the terms that best suits the buyer's situation to complete an on-line purchase process. This, of course, may be subject to a final underwriting step. Once the on-line quotes are provided and the selected quote has been chosen, a deal sheet with the terms from the selected dealer can be memorialized on a document, similar to step 340. It should be noted that step 340 generates a purchase decision aid document where the buyer can use to do the final negotiation with the dealer, the document generated in connection with the on-line quote process has the final terms from the selected dealer that allows the buyer to purchase the vehicle at those memorialized terms. The document can then be output in the form of a printed document or in an electronically shareable document, such as that in step 342 above.

Figures 4A, 4B, 4C:
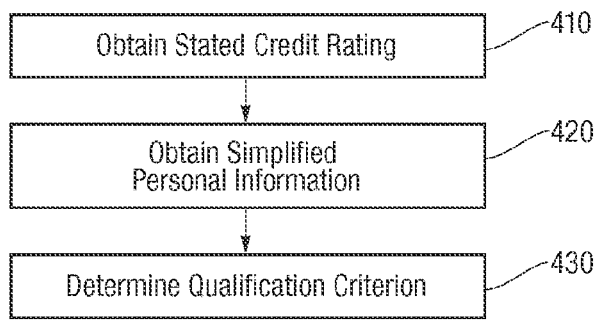
FIG. 4A depicts a method for determining a buyer qualification according to various embodiments of the disclosure.
FIGS. 4B and 4C depict exemplary data entry forms provided to a buyer.

Step 310 for determining a buyer qualification from buyer stated personal information is shown in further detail in FIG. 4A. As shown, step 310 can further include a step 410 for obtaining a stated credit rating and a set of personal information from the buyer. According to one embodiment, a data entry form, as shown in FIG. 4B, is provided to the buyer on an electronic device to obtain a buyer stated credit score, a yearly income, a yearly debt, a total down payment, and a zip code. From the buyer stated information, step 310 may further include a step 420 for calculating a plurality of buyer credit worthiness indicators, including a Gross Debt to Income (GDI) ratio and a Gross Payment to Income (GPI) ratio. According to one embodiment, the step 310 can further include a step 430 for determining, for the buyers based on the calculated GDI and GPI ratios, a plurality of loan qualification criteria including one or more of a maximum advance amount, a minimum finance amount, a money factor, and an over mileage charge.

According to one embodiment, step 310 for determining a qualification for the buyer includes calculating one or both of a leasing qualification and a financing qualification. According to one embodiment, the leasing qualification can be calculated according to the following formula:

$$\text{Monthly Payment} = \\ ((CapCost - CapCostReduction + \text{Residual} - \text{rebates and incentives}) * \\ MoneyFactor) + \left( \frac{CapCost - CapCostReduction - \text{Residual} - \text{rebates and incentives}}{Term} \right)$$

And the financing qualification can be calculated according to the following formula:

$$\text{Monthly Payment} = \\ \frac{(MSRP - DownPayment - \text{rebates and incentives}) * \left( \frac{Rate}{12} \right)}{1 - \left( 1 + \left( \frac{Rate}{12} \right) \right)^{-Term}}$$

$$MaxMonthGPI = GPIRatio * \left( \frac{StatedIncome}{12} \right)$$

$$MaxMonthGDI = GDIRatio * \left( \frac{StatedIncome}{12} \right)$$

Wherein the Rate is a loan repayment rate determined according to the buyer credit rating.

According to one embodiment, in step 320a, a revised data entry form as shown in FIG. 4C is provided to the buyer on the electronic device, in order to obtain a revised set of personal information from the buyer. In particular, the buyer can optionally revise the credit score, yearly income, yearly debt, and zip code entries. The buyer can optionally revise the down payment amount, leasing term (duration), and miles per year, in case of a leasing arrangement. Also, the buyer can optionally revise the down payment and financing term (duration), in case of a financing arrangement.

Figure 6:
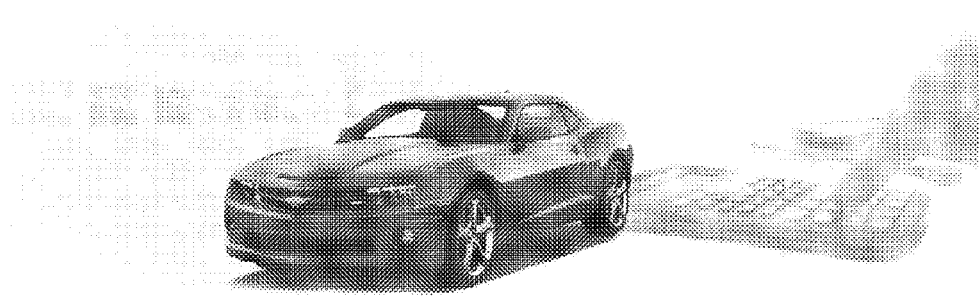

According to one embodiment, as shown in FIG. 6, a decision aid can be generated from buyer stated personal information. In various embodiments, when the buyer credit rating is not yet verified the generated decision aid may be labeled an "informational document" that does not contain terms that are necessarily agreed to by any particular dealer.

Figure 5A:
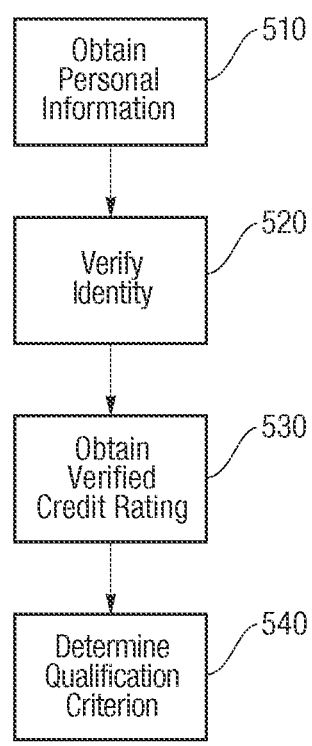
FIG. 5A depicts another method for determining a buyer qualification according to various embodiments of the disclosure.
Figure 5C:

According to another embodiment, method 300 can provide a purchase decision aid when the buyer provides personal information from which a verified credit score can be obtained from a credit reporting service provider. As such, method 300 can include a step 310 for determining buyer qualification based on personal information from the buyer. Step 310 is shown in further detail in FIG. 5A. As shown in FIG. 5A, step 310 can include a step 510 for obtaining personal information from the buyer so as to permit buyer identification to be verified. According to one embodiment, the data entry form shown in FIG. 5B can be provided to the buyer on the electronic device to collect, among other information, buyer name, address, date of birth, social security number, yearly income, down payment, and employment information from the buyer. The collected information in step 520 can be used to verify the buyer identity and in step 530 to obtain verified credit rating for buyer from a third party credit reporting agency or service provider, such as EQUIFAX, TRANSUNION, and EXPERIAN. In one embodiment, the personal information collected from the buyer can be transmitted to the credit reporting service provider in order to generate a set of identity verification questions. The identity verification questions can be provided to the buyer on the electronic device, as shown in FIG. 5C, such that buyer is permitted to provide answers to the identity verification questions in order to proof the buyer's identity. Other identity verification methods can be used. For example, a two-factor security token can be used to authenticate the buyer's identity.

FIG. 7 shows an exemplary page of a decision aid. In this example, the decision aid is a dated certificate that indicates to the buyer that the terms contained in the certificate are guaranteed by a participating dealer (i.e., the participating dealer will lease or sell the vehicle to the buyer based on the terms). As shown in FIG. 7, the generated first page can include a date of certification, on which the verification with the participating dealer is performed, and a date of expiration, on which the guarantee of terms will expire.

Figure 8:
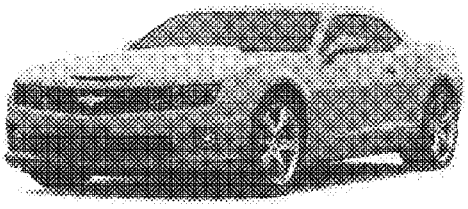
FIG. 8 depicts an exemplary vehicle presentation interface.

FIG. 8 shows an exemplary web page for presenting a list of vehicles to the buyer. In this example, two vehicles are shown together on the same screen to allow the buyer to easily compare information associated with each vehicle. As shown, a qualification indication ("QUALIFIED PAYMENT CERTIFICATE") is provided below the vehicle information for the top vehicle, while a second indication ("WE ARE SORRY—YOU DO NOT QUALIFY") is shown below the information for the bottom vehicle. This indicates the buyer is qualified for the respective lease and financing terms shown for the top vehicle, according to the buyer qualification, but not for the terms for the bottom vehicle.

FIG. 9 illustrates an exemplary data entry form that may be provided to the buyer for selection of one or more vehicle parameters, particularly a detailed trim package for a selected vehicle. In this example, when the buyer selects one or more trim package options, the lease payment amount and a finance payment amount on the left side of the page are automatically updated according to the qualification calculations discussed above.

Figure 10:
FIG. 10 depicts an exemplary decision aid generated for a buyer.

FIG. 10 illustrates an exemplary decision aid in the form of a qualified payment certificate (also referred to above as a deal sheet). In this example, the certificate includes calculated lease and financing terms based from the MSRP of a selected vehicle received from one or more dealers and agree-to by the buyer. As described above, the terms offered by the dealer, and agreed to by the dealer, can be re-verified with participating dealers and the buyer prior to issuing the certificate. As such, the certificate can represent a guaranteed price for a particle vehicle selected by the buyer.

FIG. 11 is a block diagram of an exemplary system 1100 that may be used in conjunction with various embodiments of the present disclosure. System 1100 includes computer system 1102, database 1106, network 1108, remote information system 1110, and devices 1112, 1114, and 1116. In this example, a decision assistance software program 1104 operates on computer system 1102. The decision assistance software program may implement some or all of the functionality of the methods described above.

Electronic devices 1112, 1114, and 1116 may be, or include, a laptop computer, a desktop computer, a mobile subscriber communication device, a mobile phone, a personal digital assistant (PDA), a tablet computer, and/or other electronic device. Devices 1112, 1114, and 1116 are operated by users 1122, 1124, and 1126, respectively, who may be buyers and/or sellers interfacing with computer system 1102 as described above.

FIG. 12 depicts a functional block diagram of computer system 1102 shown in FIG. 11. Computer system 1102 includes a central processing unit (CPU) 1202, a memory 1204, and an interconnect bus 1206. The CPU 1202 may include a single microprocessor or a plurality of microprocessors for configuring computer system 1102 as a multiprocessor system. The memory 1204 illustratively includes a main memory and a read only memory. The computer 1102 also includes the mass storage device 1208 having, for example, various disk drives, tape drives, etc. The main memory 1204 also includes dynamic random access memory (DRAM) and high-speed cache memory. In operation and use, the main memory 1204 stores at least portions of instructions and data for execution by the CPU 1202.

The mass storage 1208 may include one or more magnetic disk or tape drives or optical disk drives, for storing data and instructions for use by the CPU 1202. At least one component of the mass storage system 1208, preferably in the form of a disk drive or tape drive, stores the database used for providing the decision assistance of system 1100 of the present invention. The mass storage system 1208 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 1102.

The computer system 1102 may also include one or more input/output interfaces for communications, shown by way of example, as interface 1210 for data communications via the network 1108. The data interface 1210 may be a modem, an Ethernet card or any other suitable data communications device. To provide the functions of a computer system 1102, the data interface 1210 may provide a link to network 1108.

The network 1108 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

The computer system 1102 also includes suitable input/output ports or may use the interconnect bus 1206 for interconnection with a local display 1216 and keyboard 1214 or the like serving as a local user interface for programming and/or data entry, retrieval, or manipulation purposes. Alternatively, server operations personnel may interact with the system 1102 for controlling and/or programming the system from remote terminal devices via the network 1212.

The computer system 1102 may run a variety of application programs and store associated data in a database of mass storage system 1208. One or more such applications may enable the receipt and delivery of messages to enable operation as a server, for implementing server functions relating to providing purchase decision assistance using application 1104 of FIG. 11.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: shipping data, package data, and/or any data useful in the operation of the system.

Various functionality may be performed via a web browser and/or application interfacing utilizing a web browser. Such browser applications may comprise Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, Opera, or any other of the myriad software packages available for browsing the internet.

Various embodiments may operate in conjunction with any suitable operating system (e.g., Windows NT, 95/98/2000/CE/Mobile/, Windows 7/8, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

The various system components may be independently, separately or collectively suitably coupled to a network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that embodiments of the present disclosure may operate in conjunction with any suitable type of network, such as an interactive television (ITV) network.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may be located at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

The systems and methods of the present disclosure may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present invention. These and other changes or modifications are intended to be included within the scope of the present disclosure, as expressed in the following claims.

What is claimed is:

1. A computer-implemented method comprising:
   based on information received regarding a buyer that includes financial information for the buyer and one or more vehicle payment parameters, determining, by a computer system, a qualified vehicle payment amount;
   presenting, to the buyer, a list of a plurality of vehicles available to the buyer within the qualified vehicle payment amount;
   in response to receiving a quote request from the buyer on a selected vehicle from the plurality of vehicles, requesting, by the computer system, a quote on the selected vehicle from a plurality of dealers;
   receiving, by the computer system, a plurality of quotes on the selected vehicle from a plurality of responding dealers based on the quote request;
   analyzing, by the computer system, terms from the received quotes;
   providing to the buyer, by the computer system, a list of the received quotes in an order based on the terms in the received quotes.

2. The method of claim 1, wherein the information regarding the buyer further includes identification information for the buyer, and wherein the method further includes verifying an identify of the buyer based on the identification information.

3. The method of claim 1, wherein the financial information for the buyer includes one or more of:
   income for the buyer;
   debt for the buyer; and
   a credit score of the buyer.

4. The method of claim 1, wherein the vehicle payment parameters include terms related to one or more of: leasing a vehicle and purchasing a vehicle.

5. The method of claim 4, wherein the qualified vehicle payment amount includes one or more of:
   a maximum monthly payment on a financed purchase of a vehicle;
   a maximum monthly payment on a lease of a vehicle; and
   a maximum total purchase price of a vehicle.

6. The method of claim 1, wherein the list of the plurality of vehicles only includes vehicles satisfying the one or more vehicle parameters.

7. The method of claim 1, wherein presenting the list of the plurality of vehicles includes presenting vehicles that are beyond the qualified vehicle payment amount in response to input from the buyer.

8. The method of claim 1, wherein presenting the list of the plurality of vehicles includes presenting information for each of a subset of vehicles from plurality of vehicles in a single window on a display of a computing device viewed by the buyer.

9. The method of claim 1, wherein presenting the list of the plurality of vehicles to the buyer is performed without identifying a dealer associated with any of the plurality of vehicles to the buyer.

10. The method of claim 1, wherein the quote request is performed without identifying the buyer to any of the plurality of dealers.

11. The method of claim 1, wherein the information regarding the buyer includes information regarding a trade-in vehicle associated with the buyer, and wherein the quote request includes at least a portion of the information regarding the trade-in vehicle to the plurality of dealers.

12. The method of claim 1, wherein the analysis of the terms from the plurality of quotes includes analyzing one or more of:
   a percentage discount from a manufacturer's suggested retail price for the selected vehicle offered by the plurality of dealers;
   a level of similarity between the selected vehicle and vehicles from the plurality of dealers;
   an availability of the selected vehicle from the plurality of dealers; and
   a financial value associated with an offer from each of the dealers, the offer including one or more of: a financed purchase of the selected vehicle, a lease of the selected vehicle, and a cash purchase of the selected vehicle.

13. The method of claim 1, wherein the computer system receives an acceptance of the terms of one of the plurality of quotes from the buyer.

14. The method of claim 13, wherein the computer system provides a deal sheet to the buyer and the corresponding dealer that specifies the terms in the accepted quote.

15. The method of claim 14, wherein the deal sheet identifies the dealer associated with the selected vehicle.

16. The method of claim 14, wherein the deal sheet identifies the buyer.

17. The method of claim 16, further comprising charging the dealer associated with the accepted quote a fee in conjunction with providing the deal sheet to the buyer and the dealer.

18. The method of claim 13, wherein the method further includes sending a notification to the dealers associated with the other quotes that their quotes were not accepted by the buyer, the notification including information on how the other dealers' quotes compared to other quotes presented to the buyer.

19. A non-transitory, computer-readable medium storing instructions that, when executed by a computer system, cause the computer system to:
   based on information received regarding a buyer that includes financial information for the buyer and one or more vehicle payment parameters, determine, by a computer system, a qualified vehicle payment amount;

present, to the buyer, a list of a plurality of vehicles available to the buyer within the qualified vehicle payment amount;

in response to receiving a quote request from the buyer on a selected vehicle from the plurality of vehicles, request, by the computer system, a quote on the selected vehicle from a plurality of dealers;

receive, by the computer system, a plurality of quotes on the selected vehicle from a plurality of responding dealers based on the quote request;

analyze, by the computer system, terms from the received quotes;

provide to the buyer, by the computer system, a list of the received quotes in an order based on the terms in the received quotes.

20. A system comprising:

at least one processor; and memory in communication with the at least one processor and storing instructions that, when executed by the processor, cause the system to:

based on information received for a buyer that includes financial information for the buyer and one or more vehicle payment parameters, determine, by a computer system, a qualified vehicle payment amount;

present, to the buyer, a list of a plurality of vehicles available to the buyer within the qualified vehicle payment amount;

in response to receiving a quote request from the buyer on a selected vehicle from the plurality of vehicles, request, by the computer system, a quote on the selected vehicle from a plurality of dealers;

receive, by the computer system, a plurality of quotes on the selected vehicle from a plurality of responding dealers based on the quote request;

analyze, by the computer system, terms from the received quotes;

provide to the buyer, by the computer system, a list of the received quotes in an order based on the terms in the received quotes.

\* \* \* \* \*